US010263783B2

(12) United States Patent
Bohli et al.

(10) Patent No.: US 10,263,783 B2
(45) Date of Patent: Apr. 16, 2019

(54) METHOD AND SYSTEM FOR AUTHENTICATING A DATA STREAM

(71) Applicant: NEC EUROPE LTD., Heidelberg (DE)

(72) Inventors: Jens-Matthias Bohli, Leimen (DE); Wenting Li, Heidelberg (DE)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 14/913,387

(22) PCT Filed: Aug. 23, 2013

(86) PCT No.: PCT/EP2013/067579
§ 371 (c)(1),
(2) Date: Feb. 22, 2016

(87) PCT Pub. No.: WO2015/024603
PCT Pub. Date: Feb. 26, 2015

(65) Prior Publication Data
US 2016/0204942 A1    Jul. 14, 2016

(51) Int. Cl.
*H04L 9/32* (2006.01)
*G06F 21/64* (2013.01)

(52) U.S. Cl.
CPC ............ *H04L 9/3236* (2013.01); *G06F 21/64* (2013.01)

(58) Field of Classification Search
USPC ........................................................ 713/168
See application file for complete search history.

(56) References Cited

U.S. PATENT DOCUMENTS 5,745,906 A * 4/1998 Squibb .............. G06F 17/30067
6,959,384 B1 * 10/2005 Serret-Avila ............ G06F 21/64
713/176

(Continued)

FOREIGN PATENT DOCUMENTS

WO    WO 2005055515 A1    6/2005

OTHER PUBLICATIONS

Authenticating Streamed Data in the Presence of Random Packet Loss (Philippe Golle).*

(Continued)

*Primary Examiner* — Taghi T Arani
*Assistant Examiner* — Badri Narayanan Champakesan
(74) *Attorney, Agent, or Firm* — Leydig, Voit & Mayer, Ltd.

(57) ABSTRACT

A method for authenticating a data stream includes selecting a number of data fragments of the data stream, defining at least two granularity levels for the selected data fragments, dividing each of the selected data fragments according to the granularity levels, generating a hierarchical authentication structure including elements representing hash values of the divided selected data fragments on the different granularity levels, selecting at least a portion of the hash values of the hierarchical authentication structure for transmission to a receiver, reconstructing the granularity value on the top level of the hierarchical authentication structure based on the transmitted hash values, and performing authentication of the data fragments of the data stream based on comparing the reconstructed value on the top granularity level of the hierarchical authentication structure with the signed value on the top granularity level of the generated hierarchical authentication structure.

8 Claims, 2 Drawing Sheets

(56) References Cited

U.S. PATENT DOCUMENTS

| | | | | |
|---|---|---|---|---|
| 7,315,866 B2* | 1/2008 | Wu | | G06F 21/64 |
| 7,856,557 B2* | 12/2010 | Beuque | | H04L 9/3236 |
| | | | | 713/161 |
| 8,352,737 B2* | 1/2013 | Solis | | H04L 9/3236 |
| | | | | 707/693 |
| 8,572,382 B2* | 10/2013 | De Lutiis | | H04L 63/123 |
| | | | | 380/203 |
| 8,589,688 B2* | 11/2013 | Minematsu | | H04L 9/0631 |
| | | | | 380/28 |
| 8,832,466 B1* | 9/2014 | McGregor, Jr. | | H04L 9/0836 |
| | | | | 713/193 |
| 2002/0046043 A1* | 4/2002 | Smith | | G06Q 40/00 |
| | | | | 705/35 |
| 2006/0005007 A1* | 1/2006 | Sharma | | H04L 63/0428 |
| | | | | 713/153 |
| 2006/0136728 A1* | 6/2006 | Gentry | | H04L 9/3242 |
| | | | | 713/176 |
| 2007/0050627 A1* | 3/2007 | Chiku | | H04L 9/3271 |
| | | | | 713/176 |
| 2007/0074095 A1* | 3/2007 | Langner | | H04L 1/0041 |
| | | | | 714/781 |
| 2007/0179998 A1* | 8/2007 | Swanepoel | | G06F 11/1451 |
| 2008/0028224 A1* | 1/2008 | Pitsos | | G06F 21/64 |
| | | | | 713/178 |
| 2008/0091945 A1* | 4/2008 | Princen | | G06F 21/10 |
| | | | | 713/170 |
| 2008/0222414 A1* | 9/2008 | Wang | | H04L 9/0643 |
| | | | | 713/161 |
| 2009/0144598 A1* | 6/2009 | Yoon | | G06F 11/1048 |
| | | | | 714/752 |
| 2009/0164783 A1* | 6/2009 | Solis | | H04L 9/3236 |
| | | | | 713/168 |
| 2009/0292818 A1* | 11/2009 | Blount | | G06K 9/00496 |
| | | | | 709/231 |
| 2012/0117632 A1* | 5/2012 | Curtis | | G11B 20/10527 |
| | | | | 726/7 |
| 2012/0128151 A1* | 5/2012 | Boehm | | G11B 20/00086 |
| | | | | 380/42 |
| 2012/0143830 A1* | 6/2012 | Cormode | | G06F 17/30516 |
| | | | | 707/687 |
| 2012/0216043 A1* | 8/2012 | Le Cam | | G08B 13/19656 |
| | | | | 713/176 |
| 2012/0222130 A1* | 8/2012 | Lee | | G07C 5/085 |
| | | | | 726/27 |
| 2012/0240185 A1* | 9/2012 | Kapoor | | H04L 63/1425 |
| | | | | 726/1 |
| 2012/0260150 A1* | 10/2012 | Cideciyan | | G06F 11/1008 |
| | | | | 714/773 |
| 2014/0006897 A1* | 1/2014 | Franceschini | | H04L 1/0045 |
| | | | | 714/755 |
| 2014/0187190 A1* | 7/2014 | Schuler | | H04L 63/10 |
| | | | | 455/404.1 |
| 2016/0292458 A1* | 10/2016 | Serret-Avila | | G06F 21/64 |

OTHER PUBLICATIONS

Digital Signatures for Flows and Multicasts WongLam-Oct. 1998.*
Philippe Golle et al; "Authenticating Streamed Data in the Presence of Random Packet Loss", ISOC Network and Distributed System Security Symposium, Jan. 1, 2001 (Jan. 1, 2001), pp. 1-10, XP007922660, Retrieved from Internet: URL: http://crypto.stanford.eu/nagendra/projects/StreamAuth/auth.pdf.

* cited by examiner

METHOD AND SYSTEM FOR AUTHENTICATING A DATA STREAM

CROSS REFERENCE TO RELATED APPLICATIONS

This application is a U.S. National Stage Application under 35 U.S.C. § 371 of International Application No. PCT/EP2013/067579 filed on Aug. 23, 2013. The International Application was published in English on Feb. 26, 2015 as WO 2015/024603 A1 under PCT Article 21(2).

FIELD

The present invention relates to a method for authenticating a data stream, preferably a video stream and/or an audio stream and further relates to a system for authenticating a data stream, preferably a video stream and/or an audio stream.

BACKGROUND

Streamed data is wide spread used. Videos or audio streams are generated and transmitted to a plurality of users via Internet, e.g. users select their favorite radio sender and the corresponding radio sender provides the corresponding audio stream to internet radios of the respective users.

Data streams are also used for surveillance of private or public places. Video cameras are used for capturing visually the corresponding places. The video streams are stored at least temporarily and can for example be used by law enforcement agencies not only to support an investigation in a criminal case but such stored video streams may also be an important evidence which can be used before court.

However, a cogency of a video stream of a surveillance camera to be used as a forensic evidence can be questioned. Therefore, the video stream needs to be authenticated by the original camera when the video stream is generated. Third parties, for example a court, must somehow be able to verify the authentication.

However, a direct application of for example digital signatures on a clip of the video stream may fail due to packet loss in the video stream. Another drawback is a limited flexibility, since for example a video clip can only be authenticated as a whole.

In the non-patent literature "How to sign digital streams", of Rosario Gennaro, Pankaj Rohatgi, 17th Annual International Cryptology Conference Santa Barbara, Calif., 1997 Proceedings, Page 180-197, a method for signing of data streams is shown. However, one of the drawbacks is, that—when packet loss occurs—one lost packet is sufficient so the rest of the data stream cannot be authenticated anymore.

To overcome this problem in the non-patent literature "Digital Signatures for Flows and Multicasts", of Chung Kei Wong, Wong Simon, Simon S. Lam, IEEE/ACM Transactions on Networking (TON) archive, Volume 7 Issue 4, August 1999, Page 502-513 a chaining signing technique was proposed. First a partition of a flow in blocks of packets is performed. The digest of each block is then signed and the block signature as well a corresponding authentication info is added to each packet so that each packet carriers its own authentication information to prove that it is in the block. However, the communication overhead by attaching this information of all the other packets in the same group to each packet is significantly increased.

In the non-patent literature "Efficient authentication and signing of multicast streams over lossy channels", of Adrian Perrig, J. D. Tygar, Dawn Song, Ran Canetti, Security and Privacy, 2000 Proceeding SP'00 Proceedings of the 2000 IEEE Symposium on Security and Privacy, Page 56 and "Authenticating Streamed Data in the Presence of Random Packet Loss (Extended Abstract)", of Philippe Golle, Nagendra Modadugu, ISOC Network and Distributed System Security Symposium 2001, Page 13-22, further authentication methods for data streams based on the chaining principle are described. For example packet hashes are duplicated and appended to other packets to make an authentication of a data stream robust against random/burst loss of packets.

One of the drawbacks is however, that in order to verify one data packet of the data stream all other data packets in the downstream of the packet chain till the signing point must be measured or analysed: For example in a packet a hash is included of a previous packet and a signature packet at the end of the data stream is sent which contains the hash of the final packet along with a signature. Further each packet contains multiple hashes of previous packets and the final signature packet signs the hash of the multiple packets. Another drawback is, that the above mentioned conventional methods are focused on real-time data authentication based on the transmitted packets and are therefore inflexible: A received single packet out of a data stream cannot be authenticated without at least knowing a significant part of the complete data stream.

SUMMARY

In an embodiment, the present invention provides a method for authenticating a data stream including selecting a number of data fragments of the data stream; defining at least two granularity levels for the selected data fragments; dividing each of the selected data fragments according to the granularity levels; generating a hierarchical authentication structure including elements representing hash values of the divided selected data fragments on the different granularity levels, wherein a hash value for a data fragment on a higher granularity level is based on hash values of data fragments on a lower granularity level; selecting at least a portion of the hash values of the hierarchical authentication structure for transmission to a receiver; reconstructing the granularity value on the top level of the hierarchical authentication structure based on the transmitted hash values; and performing authentication of the data fragments of the data stream based on comparing the reconstructed value on the top granularity level of the hierarchical authentication structure with the signed value on the top granularity level of the generated hierarchical authentication structure.

BRIEF DESCRIPTION OF THE DRAWING

The present invention will be described in even greater detail below based on the exemplary figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Figure 1:
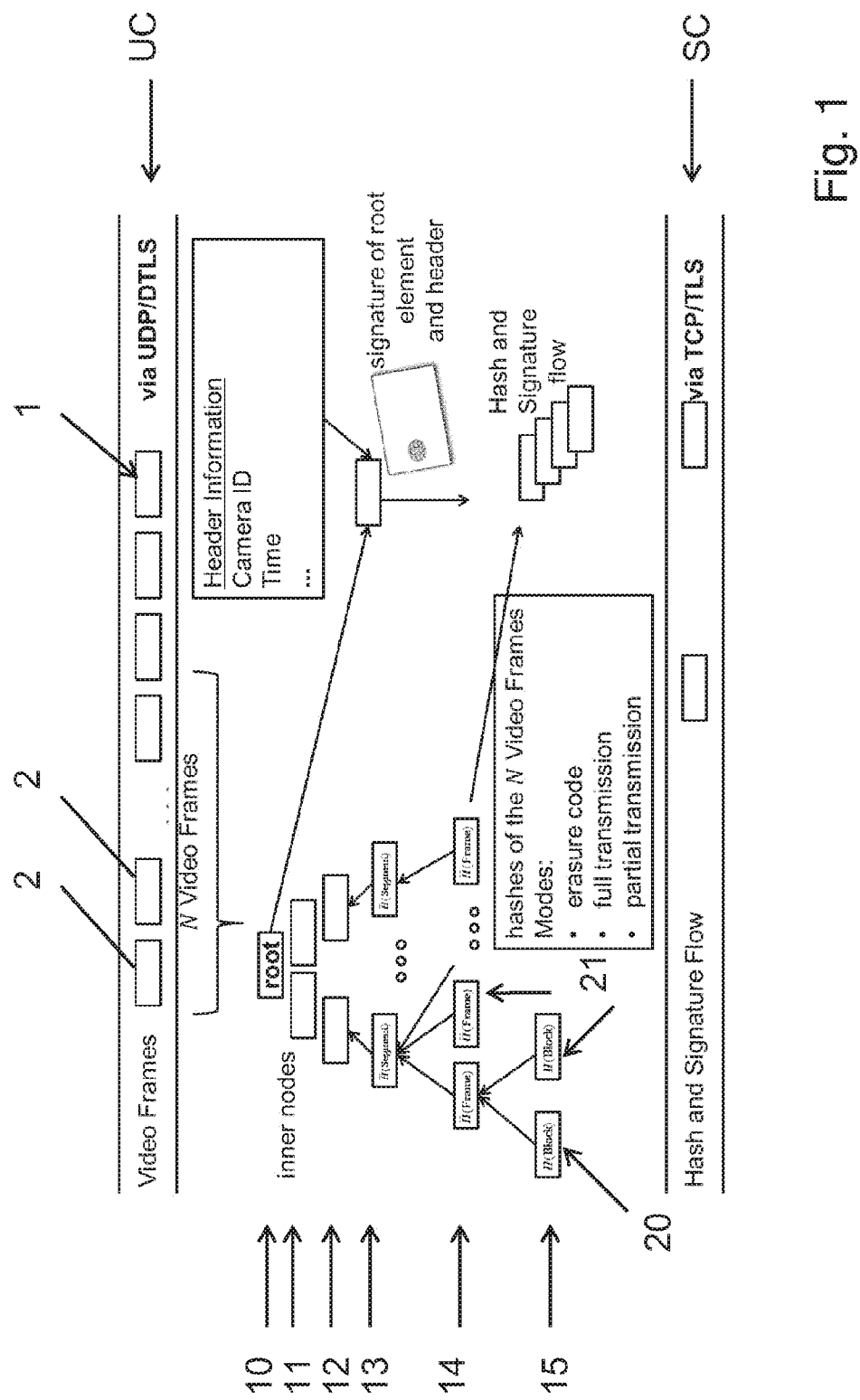
FIG. 1 shows a method according to an embodiment of the present invention.

Although applicable in general to any sort or type of data stream the present invention will be described with regard to video streams.

An embodiment of the present invention provides a method and a system for authenticating a data stream which is robust against packet loss.

An embodiment of the present invention provides a method and a system for authenticating a data stream enabling the possibility of disclosing only parts of the data stream in an authenticated way.

An embodiment of the present invention provides a method and a system for authenticating a data stream providing increased flexibility.

An embodiment of the present invention provides a method and a system for authenticating a data stream providing non-repudiation of the data stream.

A method for authenticating a data stream, preferably a video stream and/or an audio stream, is characterized in that:
   a) a number of data fragments of the data stream are selected,
   b) at least two granularity levels are defined for the selected data fragments,
   c) the selected data fragments are each divided according to the granularity levels,
   d) a hierarchical authentication structure, preferably a hash-tree, is generated including elements, preferably leaves of the hash-tree, representing hash values of the divided fragments on the different granularity levels, wherein a hash value for a data fragment on a higher granularity level is based on hash values of data fragments on a lower granularity level,
   e) at least part of the hash values of the hierarchical authentication structure, preferably the hash tree, are selected for transmission to a receiver, the value on the top level of the hierarchical authentication structure, preferably the root of the hash tree, is reconstructed based on the transmitted hash values and that
   g) the data fragments of the data stream are authenticated based on comparing the reconstructed value on the top level of the hierarchical authentication structure, preferably the reconstructed root, with the signed value on the top level of the generated hierarchical authentication structure, preferably the signed root of the generated hash-tree.

In an embodiment, a system for authenticating a data stream, preferably a video stream and/or an audio stream, is characterized in that the sending entity is operable to generate a hierarchical authentication structure, preferably a hash-tree, including elements, preferably leaves of the hash-tree, representing hash values of the divided fragments on the different granularity levels, wherein a hash value for a data fragment on a higher granularity level is based on hash values of data fragments on a lower granularity level, and that the receiving entity is operable to authenticate the data fragments of the data stream based on comparing a reconstructed value on the top level of the hierarchical authentication structure, preferably a reconstructed root, with the signed value on the top level of the generated hierarchical authentication structure, preferably the signed root of the generated hash-tree.

The number of data fragments to be selected may be only one or a plurality of data fragments. The term "granularity level" in connection with a data fragment can be used to define a subdivision or subfragment of a data fragment.

According to an embodiment of the invention it has been recognized that by defining different granularity levels and generating a hierarchical authentication structure, e.g. a hash tree, with hash values of the fragments on the different granularity levels, a non-repudiation of the selected number of data fragments of the data stream can be provided.

According to an embodiment of the invention it has been further recognized that robustness against packet loss on the communication channel is enabled. For example if packet loss is high then the granularity level may be adapted accordingly.

According to an embodiment of the invention it has been further recognized that partial disclosure is enabled, i.e. unimportant parts of the data stream can be omitted or deleted on the receiver side whereas the remaining data of the data stream can still be authenticated.

According to an embodiment of the invention it has been further recognized that flexibility is enhanced: For example the hash tree can be provided with further granularity levels providing a more fine-grained authentication level according to the needs of a user.

According to an embodiment of the invention it has been further recognized that resources, in particular storage space can be saved, since the partial disclosure allows that unimportant parts of the data stream can be deleted while remaining data can still be authenticated.

In other words, an embodiment of the present invention provides in particular an inter-level dependency of hash values between different granularity levels via a so-called modified hash function. On each granularity level hash values for the data fragments respecting a certain granularity are provided. The term "granularity" is preferably related to fragment size, i.e. a higher granularity level means data fragments having a size greater than data fragments on a lower level. In case of a video stream a video frame comprises a plurality of blocks, thus the granularity level for "frame" is a higher level to the granularity level for "block".

According to an embodiment, in step e), hash values on one selected granularity level are selected for transmission. This enables for example to reduce the data transmission for the hash values parallel to the video frame since only the hash values on the selected granularity level are transmitted to a receiver. The receiver then uses the transmitted hash values to reconstruct the top level of the hierarchical authentication structure, preferably the hash tree and the respective root. Upon matching authentication of the selected data fragments is enabled.

According to a further embodiment the granularity levels are at least partially defined based on the semantic representation of the data stream. Semantic representation is to be understood in a general way: For example in case of a video stream as a data stream the "natural" representation of the video stream are a sequence of frames wherein each frame is further divided into different blocks. Therefore for example a segment may be defined comprising a plurality of frames wherein each frame comprises a plurality of blocks. If for example a more fine-grained authentication level is needed then a current granularity level—say frame level—may be changed to a granularity level of blocks enabling the use of a smaller unit for authentication of data fragments of a data stream if required.

According to a further embodiment the granularity level for the hash values to be transmitted is adapted during transmission of the data stream according to transmission properties between sender and receiver of the data stream. This allows for example to flexibly adapt the granularity level of the hash values which are then transmitted to the receiver and therefore the authentication level according to transmission properties.

According to a further embodiment packet loss and/or bandwidth between a sender and a receiver is determined for providing the transmission properties. For example, if there is a high packet loss between a sender and a receiver a switching to a more fine-grained authentication level is enabled. In other words when the packet loss rate is high and in case of a video stream a switching may be performed from a frame authentication to the block authentication enabling a reliable authentication even in case of high packet loss.

According to a further embodiment an erasure code is used for transmitting partitions of the hash values according to step e). By using an erasure code the overhead of the amount of hash data to be transmitted from sender to receiver is significantly reduced. For example when an erasure code is used a number of r blocks or frames of loss are tolerated. Then r partitions of the hash values are transmitted to the sender so if a number of at most r blocks of a frame are not received, then the remaining blocks along with the r partitions can still be authenticated by reconstructing the hash values. Upon reconstructing the hash values the top level of the hierarchical authentication structure, e.g. root of the hash tree can be reconstructed and used for authentication of the data fragments of the data stream.

According to a further embodiment a linear error correcting code, preferably the low-density parity-check code, or a cyclic error correcting code, preferably the Reed-Solomon code, as erasure code is used. For example using the Reed-Solomon code a non-binary cyclic error correcting code is provided suitable in particular for applications where transmission errors occur in burst. Both codes provide a reliable forwarding error correction.

According to a further embodiment the data stream is analyzed and based in the result the erasure code and/or the granularity levels are determined. This enables to find a good trade-off between efficiency and robustness of the authentication of the data stream. For example information from the data stream encoding, in case of a video stream, this may be a video codec, can be used to find optimal settings for the organization of the hierarchical authentication structure hash tree and/or for the erasure code.

According to a further embodiment sender identity information are generated and used for authentication of the data stream. This enables an easy identification of the sender for authentication. For example sender identify information can be included in header information together with a time stamp of the respective data fragments. This time information may for example be used for a plausibility check and/or to select a desired sequence of frames of a video stream. Further sender identity information may be for example the length of the data fragments or the like. Therefore the term "sender identity information" is to be understood in a general way, not only directly related to the identity of the sender but also related in general to characteristics or parameters enabling identification of the origin/sender of the data stream.

According to a further embodiment the hash values and/or sender identity information and/or signature information are transmitted via a secure channel. For example a secure channel may be a connection based on transport control protocol/transport layer security (TCP/TLS) or a virtual private network (VPN) connection or the like. This provides a reliable transmission and identification of the sender, a reception of sender identity information or the like.

In FIG. 1 a data stream 1 in form of a sequence of video frames 2 is transmitted via user datagram protocol/datagram transport layer security (UDP/DTLS) on an unsecured channel (UC). For authenticating a number N of the video frames 2 a hash tree 20 is generated. The hash tree 20 comprises different granularity levels 10, 11, 12, 13, 14, 15. The root level is denoted with the reference sign 10 and the further levels below are denoted with reference signs 11-15. For example a video stream has a semantic representation in form of segments comprising a plurality of frames wherein each frame comprises a plurality of blocks. Therefore the hash tree 20 comprises hash values 21 wherein for example in FIG. 1 two hash values 21 of different blocks of a frame on the respective granularity level 15 for the blocks are included in a hash value for the frame on the granularity level 14 for the frames above the granularity level 15 for the blocks.

The semantic representation of a data stream may represent the whole hash tree 20 below the root level 10 or may be embedded in the hash tree 20 with granularity levels below and/or above the granularity levels 13-15 of the semantic representation.

The hash values 21 based on the frames on the frame granularity level 14 are then used for generation of hash values for the corresponding segment on a segment level 13. The number of the leaves respectively the hash values 21 on the frame level 14 corresponds to the number of N video frames. In detail, for example for generating a hash value 21 for a certain frame a so called modified hash function $\overline{H}$ is constructed preferably respecting the semantic representation of the video stream, in particular the division of the video stream into segments, frames and blocks. Further in case of the video stream 1 a cryptographic hash function H, for example SHA-3 is used to build up hash values for a certain frame built up from the hash values of the blocks of the respective frame. This enables the switching to the transmission of smaller units on-the-fly, i.e. by increasing the depth of the hash tree 20 by using hash values on an adjacent lower level.

In other words when for example the transmission properties are bad, it can be switched from frame authentication to block authentication by deepening the hash tree, preferably a Merkle tree or another suitable tree structure, by one level.

In FIG. 1 a frame is divided into a number of blocks $x_1, \ldots, x_n$. The division between different granularity levels 10-15 for the corresponding data fragments can be fixed, for example can be based on fixed-sized blocks or may be depending on the corresponding data stream encoding, for example an underlying video codec or the like.

To generate a hash value $\overline{H}$ on a certain granularity level 10-15, the hash value may be constructed as follows:

$$\overline{H}(x_1 \ldots x_n) = H(H(x_1), \ldots, H(x_n))$$

In other words, for example the hash values $H(x_1), \ldots, H(x_n)$ on the block granularity level 15 for the blocks $x_1, \ldots, x_n$ are used as input for a hash function for generating a hash value $\overline{H}$ for the frame on the frame granularity level 14. The hash value $\overline{H}$ for the segments on the respective segment granularity level 13 are then generated based on the hash values 20 for the frames on the frame granularity level 14.

The leaves of the hash tree 20 may be chosen as follows: When hash values 21 for blocks on the block granularity level 15 are hashed within a frame with a hash function H then one is able to authenticate a partial frame. For example in order to authenticate a partial frame this one frame has to be revealed. Further the hash values 20 of the frames corresponding to the segment for the revealed frame on the granularity level above, i.e. in FIG. 1 this is the segment level 13, have to be revealed. Therefore the hash value for this segment can be constructed. Further the other hash values for the segments in the respective branch starting from the root level 10 as well as the hash values on the other branches of the hash tree 20 on the highest level 11 below the root level 10 have to be revealed. Then a verifier, for example a court or the like, may authenticate the corresponding revealed frame based on the reconstruction of the hash tree 20, i.e. the reconstructed root.

In particular if the hash of blocks within the frame is in sync with the semantic structure of the video frame, i.e. the packet size, all information received by a verifier may be authenticated even when the packet loss is high.

The leaves 21 of the hash tree 20 may also comprise hash values of the frame with the modified hash function $\overline{H}$. This enables a reduced communication overhead since fewer hash values have to be transmitted for authentication. Even further in case of video frames as a data stream the hash values for I-frames, i.e. frames indicating beginning or ending of a segment, may be omitted to reduce the communication overhead even further. Packet loss may result in an unauthenticated frame, however a verifier is still able to authenticate all other frames.

When the leaves of the hash tree 20 are provided with hash values 21 of a segment with a modified hash function $\overline{H}$, a loss of a frame results in an unauthenticated group, wherein the group comprises a plurality of segments. Further the segment should start an end with an I-frame, i.e. I-frames are part of two consecutive segments. The granularity level 10-15, i.e. number of the leaves of the hash tree 20 may be arbitrarily chosen. For example the leaves of the hash tree 20 may be based on the desired trade-off between communication overhead and packet loss resistance. Further the granularity levels 10-15 may be respecting the semantic representation of the data stream 1. For example a video stream 1 comprises frames, wherein frames comprises a plurality of blocks and a plurality of frames are defined as a segment to that the video frame comprises different segments, wherein each segment has a plurality of frames wherein each frame has a plurality of different blocks. From the generated hash values of a certain granularity level, for example denoted with reference sign 15, the hash values of the upper granularity levels 14, 13, 12 and 11 as well as 10 are built up. The hash tree 20 can be of any form, preferably is a Merkle hash tree.

After generating the hash tree 20 the root of the hash tree 20 together with a header comprising sender identity information, for example including a time stamp, a sensor identification or a camera identification and/or the lengths of the data fragments on one or more granularity levels is signed with a digital signature, preferably in a security module in a sending entity. The hash values of a selected granularity level are then encoded and transmitted together with the signature of the sending entity in addition to the video stream to a verifier. This transmission is preferably performed over a reliable channel, for example using TCP/TLS as a transport protocol. No strict synchronization is needed between the reception of the hash values and the reception of the corresponding data fragments of the data stream 1.

The transmission of the hash values 21 on the selected granularity level can be performed in the following: One option is to transmit all hash values 21 on the selected granularity level. Another option is to use an erasure code, for example a low-density parity-check (LDPC) code or a Reed-Solomon code and only transmit a selection of the hash values for a certain number of data fragments on the chosen granularity level. The erasure code enables to tolerate a number of r blocks, for example r frames or segments which can be lost. Only r partitions of all hash values on the corresponding granularity level 10-15 are transmitted over a reliable channel (SC) from the sending entity to the receiving entity. If the number of lost blocks of a frame is smaller or equal to r then the rest of the blocks in the corresponding granularity level along with the r partitions can still be authenticated by reconstructing the hash values and therefore reconstructing the root of the hash tree.

To define an appropriate granularity level 10-15 for the hash values 21 all available information from the data stream encoding, for example the used video codec or the like can be used to find optimal settings for the hash tree 20 as well as for the erasure code providing a desired trade-off between efficiency and robustness. In general the sending entity may be any data source equipped with security module enabling a signing of the data stream with a signature, preferably periodically. Further preferably the security module is based on secure hardware, for example a smart card protecting the secret signing key.

Further the function for generating the elements of the hierarchical authentication structure may be a hash-function preferably any suitable hash function, in particular SHA-3.

In particular if for example a packet loss rate is above a certain threshold, wherein the packet loss may be determined by a sender, for example by sending out pings periodically, or determined by a receiver, for example by counting periodically sent out pings or by an internet operator knowing the connection characteristics in his own network, the granularity level 10-15, which is selected for transmission of the hash values 21 from that granularity level 10-15 for authentication may be adapted on-the-fly. If the packet loss is high, the level may be redefined, i.e. a lower level, for example a switching from level 14 to level 15 in FIG. 1, may be appropriate to take into account the packet loss and still being able to authenticate the selected data fragments of the data stream 1.

Figure 2:
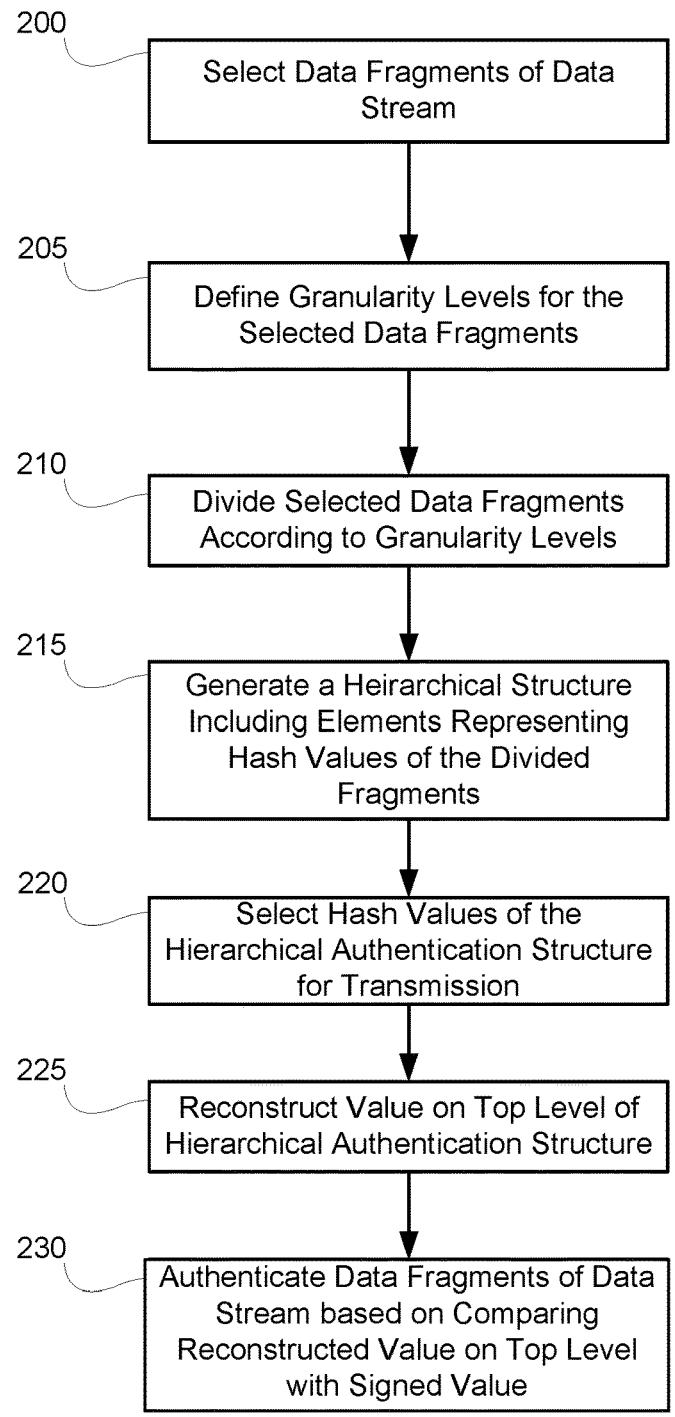
FIG. 2 is a flow diagram showing a method according to an embodiment of the present invention.

FIG. 2 is a flow diagram showing a method according to an embodiment of the present invention. The method of FIG. 2 is a method for authenticating a data stream, preferably a video stream and/or an audio stream. At 200, the method selects a number of data fragments of a data stream. At 205, the method defines at least two granularity levels for the selected data fragments. The granularity levels can be at least partially defined based on the semantic representation of the data stream. At 210, the method divides the selected data fragments according to the granularity levels. At 215, the method generates a hierarchical structure including elements representing hash values of the divided fragments on the different granularity levels. The hash value for a data fragment on a higher granularity level is based on hash values of data fragments on a lower granularity level. The hierarchical authentication structure can be, according to some embodiments, a hash-tree, and the elements representing hash values of the divided fragments can be, according to some embodiments, leaves of a hash-tree. At 220, the method selects at least part of the hash values of the hierarchical authentication structure for transmission to a receiver. At 225, the method reconstructs a value on a top level of the hierarchical authentication structure based on the transmitted hash values. The value on the top level of the hierarchical authentication structure can be, according to some embodiments, a root of the hash tree. At 230, the method authenticates the data fragments of the data stream based on comparing the reconstructed value on the top level of the hierarchical authentication structure with a signed value on the top level of the hierarchical authentication structure. According to some embodiments of the invention, the reconstructed value on the top level of the hierarchical authentication structure is a reconstructed root of a hash tree and the signed value on the top level of the hierarchical authentication structure is a signed root of a hash-tree.

In summary, an embodiment of the present invention enables a redefined hash function for the leaves of the hash tree, so that the hash tree is flexible to be extended to a more fine-grained authentication level. The present invention further enables to apply an erasure code to reduce the overhead of the amount of hash values to be transmitted.

An embodiment of the present invention has several advantages. An embodiment of the present invention enables authentication of data streams, preferably video streams which are robust against packet loss. An embodiment of the present invention further provides an on-the-fly adaptable authentication to trade-off overhead and robustness, preferably enabling to react to a changing channel bandwidth and/or channel quality on the communication channel between the sending entity and the receiving entity. Even further the present invention increases the flexibility by enabling to disclose only parts of the data stream in an authenticated way. An embodiment of the present invention provides non-repudiation and therefore strong evidence of the correctness of the data stream, preferably a surveillance camera video stream and tolerates partial disclosure: Partial disclosure means that unimportant parts of the data stream can be deleted on the receiver side in order to save storage space while the remaining data can still authenticated by a verifier.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for authenticating, using data transmitted via a secure channel, at least a portion of a data stream transmitted by a sender via an unsecure channel, wherein the sender includes secure hardware storing a secret signing key, the method comprising:

receiving, by a verifier from the sender via the unsecure channel, the portion of the data stream transmitted by the sender, wherein the portion of the data stream transmitted by the sender includes a plurality of data fragments on different granularity levels;

receiving, by the verifier from the sender via the secure channel, a root, signed with a digital signature corresponding to the secret signing key, of a hierarchical authentication structure, wherein the hierarchical authentication structure includes elements representing hash values of the data fragments of the data stream on the different granularity levels, wherein a hash value for a data fragment on a higher granularity level is based on the hash values of the data fragments on a lower granularity level;

receiving, by the verifier from the sender via the secure channel, a portion of the hash values of the data fragments from the hierarchical authentication structure;

reconstructing, by the verifier, a top granularity level value of the hierarchical authentication structure by computing the hash values of the plurality of data fragments of the portion of the data stream received by the receiver from the sender via the unsecure channel and using the portion of the hash values received from the sender via the secure channel, and performing authentication of the portion of the data stream received by the verifier from the sender via the unsecure channel by comparing the reconstructed top granularity level value of the hierarchical authentication structure with the root of the generated hierarchical authentication structure signed with the digital signature, wherein an erasure code is used for transmitting partitions of the portion of the hash values received from the sender, and wherein the data stream is analyzed, and based on a result, the erasure code and/or the different granularity levels are determined.

2. The method according to claim 1, wherein the portion of the hash values received from the sender via the secure channel are hash values on a granularity level selected by the sender.

3. The method according to claim 1, wherein the granularity levels are at least partially defined based on a semantic representation of the data stream.

4. The method according to claim 2, wherein the granularity level selected by the sender is adapted during transmission of the data stream via the unsecured channel according to transmission properties between the sender and receiver of the data stream.

5. The method according to claim 4, wherein packet loss and/or bandwidth between sender and receiver is determined for providing the transmission properties.

6. The method according to claim 1, wherein a linear error correcting code and/or a cyclic error correcting code is used as the erasure code.

7. The method according to claim 1, wherein sender identity information is generated and used for authentication of the portion of the data stream received by the verifier.

8. A system for authenticating, using data transmitted via a secure channel, at least a portion of a data stream transmitted by a sender via an unsecure channel, the system comprising:

the sender, wherein the sender includes secure hardware storing a secret signing key;

and a verifier, wherein the verifier includes a hardware processor, wherein the sender is configured to:

analyze the data stream, and based on a result, determine an erasure code and/or different granularity levels of the data stream, generate a hierarchical authentication structure including elements representing hash values of data fragments of the data stream on different granularity levels, wherein the hash values for the data fragments on higher granularity levels are based on the hash values of data fragments on lower granularity levels, select at least a portion of the hash values of the hierarchical authentication structure for transmission, via the secure channel, to the verifier, transmit, to the verifier via the secure channel and using the erasure code, the selected portion of the hash values and a root of the hierarchical authentication structure signed with a digital signature corresponding to the secret signing key, transmit, to the verifier via the unsecure channel, the data stream, and wherein the verifier is configured to:

receive, from the sender via the unsecure channel, the portion of the data stream transmitted by the sender, wherein the portion of the data stream transmitted by the sender includes a plurality of the data fragments on different granularity levels, receive, from the sender via the secure channel, the selected portion of the hash values of the data fragments and the root of the hierarchical authentication structure signed with the digital signature corresponding to the secret signing key, reconstruct a top granularity level value of the hierarchical authentication structure by computing the hash values of the plurality of the data fragments of the portion of the data stream received by the receiver from the sender via the unsecure channel and using the selected portion of the hash values transmitted by the sender via the secure channel, and authenticate the portion of the data stream by comparing the reconstructed top granularity level value of the hierarchical authentication structure with the root of the hierarchical authentication structure signed with the digital signature.

* * * * *